(12) United States Patent
Zhao et al.

(10) Patent No.: US 11,364,626 B2
(45) Date of Patent: Jun. 21, 2022

(54) 6-DOF PARALLEL ROBOT WITH A DOUBLE-GYROSCOPIC COMPONENT

(71) Applicant: HRG International Institute for Research & Innovation, Hefei (CN)

(72) Inventors: Longhai Zhao, Hefei (CN); Linsong Zhang, Hefei (CN); Zhenzhong Yu, Hefei (CN); Wenxing Li, Hefei (CN); Wen Cui, Hefei (CN); Xinze Lu, Hefei (CN)

(73) Assignee: HRG INTERNATIONAL INSTITUTE FOR RESEARCH & INNOVATION, Hefei (CN)

( * ) Notice: Subject to any disclaimer, the term of this patent is extended or adjusted under 35 U.S.C. 154(b) by 121 days.

(21) Appl. No.: 16/826,418

(22) Filed: Mar. 23, 2020

(65) Prior Publication Data
US 2021/0069896 A1 Mar. 11, 2021

(30) Foreign Application Priority Data

Sep. 9, 2019 (CN) .......................... 201910847005.0

(51) Int. Cl.
*B25J 9/00* (2006.01)
*B25J 9/06* (2006.01)
*B25J 17/00* (2006.01)

(52) U.S. Cl.
CPC ............. *B25J 9/06* (2013.01); *B25J 9/0012* (2013.01); *B25J 9/0051* (2013.01); *B25J 17/00* (2013.01)

(58) Field of Classification Search
CPC .................................. B25J 9/0051; B25J 9/06
See application file for complete search history.

(56) References Cited

U.S. PATENT DOCUMENTS

| 2014/0014219 A1* | 1/2014 | Takemura | B32B 25/14 138/140 |
| 2014/0360306 A1* | 12/2014 | Mihara | B25J 19/0029 74/490.02 |
| 2015/0040713 A1* | 2/2015 | Hirano | B25J 19/0029 74/490.02 |

(Continued)

FOREIGN PATENT DOCUMENTS

| CN | 102642205 A | * | 8/2012 | ............ B25J 9/0051 |
| CN | 103846907 A | * | 6/2014 | ............ B25J 9/0051 |

(Continued)

OTHER PUBLICATIONS

CN 103846907 A (Xueman Zhao) Jun. 11, 2014. [online] [retrieved on Dec. 9, 2021]. Retrieved from: ProQuest Dialog. (Year: 2014).*

*Primary Examiner* — Joseph Brown (57) ABSTRACT

A 6-dof parallel robot with a double-gyroscopic component comprises a fixed platform (1), a moving platform (2) and two modules of 3-dof translational robotic component (3); wherein two modules of 3-dof translational robotic component (3) are connected between the moving platform (2) and the fixed platform (1). The 6-dof parallel robot with a double-gyroscopic component provided by the present invention has the following advantages: excellent dynamic performance, compact structure, six degrees of freedom motion with no singularity, high rigidity, high precision, good stability, a large rotational workspace, etc., thus having a broad prospect in both scientific research and industrial application.

9 Claims, 6 Drawing Sheets

(56) References Cited

U.S. PATENT DOCUMENTS

| | | | |
|---|---|---|---|
| 2016/0114481 A1* | 4/2016 | D'Egidio | B25J 9/1065 |
| | | | 414/729 |
| 2018/0085913 A1* | 3/2018 | Ilch | B25J 17/0266 |
| 2018/0194016 A1* | 7/2018 | Nakanishi | B25J 9/0018 |
| 2018/0236655 A1* | 8/2018 | Nakanishi | B25J 9/0051 |

FOREIGN PATENT DOCUMENTS

| | | | | |
|---|---|---|---|---|
| CN | 103846911 B | * | 6/2016 | B25J 9/0051 |
| CN | 108858139 A | * | 11/2018 | |
| DE | 102016108215 A1 | * | 11/2017 | B25J 9/0051 |

* cited by examiner

6-DOF PARALLEL ROBOT WITH A DOUBLE-GYROSCOPIC COMPONENT

BACKGROUND OF THE INVENTION

Technical Field

The present invention relates to a robotic engineering technology field, in particular to a 6-dof parallel robot with a double-gyroscopic component in a light type of robot apparatus.

Description of Related Art

In a light type of production line, such as the packaging process and the sorting process of goods, some complicated processing operations such as complex surface coating, spraying, dispensing are usually implemented by serial robots/mechanisms. Each part of the serial mechanism is connected in serial by kinematic pair, which is open-loop structure with a large workspace and high flexibility, but they have some significant disadvantages: the cumulative error of each kinematic pair results in low accuracy of the end-effector, low rigidity, large inertia, poor dynamic properties. In the meantime, the parallel mechanism is a closed-loop structure, where the moving platform is connected with the fixed platform by at least two independent kinematic limbs. Compared with the serial mechanism, the parallel mechanism has the following advantages: high rigidity, high precision, good dynamic properties, as well as a compact structure.

Based on the above-mentioned advantages of the parallel mechanism, patent document U.S. Pat. No. 4,976,582 provides a Delta parallel mechanism with three symmetric kinematic limbs, which can achieve the 3-dof spatial translational movement, and has a high speed feature. On the basis of this configuration, in the patent application US20090019960 and EP1084802 filed by ABB company provides a "Flexpicker" parallel robot, which is used in the rapid sorting process of the food packaging production line to replace the manual operation, so the pickup operation can be more flexible and efficient. Furthermore, Pierrot et al. provides a H4 parallel mechanism, with four limbs and two moving platforms, which can achieve the SCARA motions. Then Adept company successfully commercialized it, with a typical representative of "Adept Quattrro" parallel robot.

Existing parallel mechanisms have the following disadvantages:

1. Delta mechanism has only three degrees of freedom of translational motion, so the rotation motion in the pickup operation cannot be achieved;

2. Many components of the moving platform in H4 mechanism are located in the same plane, which makes the moving platform large in size, and the adjacent two limbs drive the same component in the moving platform, which results in poor force transmission and poor energy efficiency of the mechanism;

3. The size of the moving platform is too large, and the amplifying mechanism installed in the moving platform makes it heavier; and the driven component of the moving platform corresponds to a group of opposite sides of a parallelogram, which makes the structure less compact, inflexible, inefficiency, and uneven in load bearing;

4. Only two components on the moving platform is driven, which correspond to a group of opposite sides of a parallelogram, resulting in less flexible in driving mode, and uneven in load bearing; so the smooth operation of mechanism will be hard to achieve.

Thus, in view of the above-mentioned deficiencies, it is necessary to design a new parallel robot, which can provide the following advantages: excellent dynamic performance, compact structure, six degrees of freedom motion with no singularity, high rigidity, high precision, good stability, a large rotational workspace.

Content

The present invention aims to solve at least one of the above-mentioned technical problems, which provides a parallel robot and has the following advantages: excellent dynamic performance, compact structure, six degrees of freedom motion with no singularity, high rigidity, high precision, good stability, a large rotational workspace.

In order to solve the above technical problems, the present invention employs the following technical solutions:

A 6-dof parallel robot with a double-gyroscopic component comprises a fixed platform 1, a moving platform 2 and two modules of 3-dof translational robotic component 3, wherein the two modules of 3-dof translational robotic component 3 are connected between the moving platform 2 and the fixed platform 1.

Further, the moving platform 2 is constituted by a double-gyroscopic component, which comprises an upper moving platform gyroscope subcomponent 2-1, a lower moving platform gyroscope subcomponent 2-2 and screw-nut subcomponent 2-3.

Further, the upper moving platform gyroscope subcomponent 2-1 comprises an upper platform inner ring, an upper platform middle ring, and an upper platform outer ring. The upper platform outer ring surrounds the upper platform inner ring and the upper platform middle ring, and the upper platform middle ring surrounds the upper platform inner ring. A pair of the first part 2-21 of the first revolute joint is symmetrically disposed in a diametric direction of the outer circumferential surface of the upper platform inner ring; in the meantime, a pair of the second part of the first revolute joint is disposed in the inner circumferential surface of the upper platform middle ring of the upper moving platform gyroscopic subcomponent 2-1, which is also arranged in a face-to-face position with the first part 2-21 of the first revolute joint. After the first and second parts of the first revolute joint are assembled, the rotation around the X axis can be achieved; then, the first part 2-23 of the second revolute joint is symmetrically disposed in the diametrical direction of the outer circumferential surface of the upper platform middle ring of the upper moving platform gyroscopic subcomponent 2-1, which is also perpendicular to the X axis; in the meantime, the second part 2-24 of the second revolute joint is disposed in the inner circumferential surface of the upper platform outer ring, in a face-to-face position with the first part 2-23 of the second revolute joint. After the first and second parts of the second revolute joint are assembled, the relative rotation between the two parts can be achieved, thereby the upper platform middle ring can rotate around the Y axis freely, which is perpendicular to the X axis.

Further, the lower moving platform gyroscope subcomponent 2-2 comprises a lower platform inner ring, a lower platform middle ring, and a lower platform outer ring. The lower platform outer ring 2-33 surrounds the lower platform inner ring 2-32 and the lower platform middle ring 2-31. The lower platform middle ring surrounds the lower platform inner ring. A pair of the first part 2-41 of the third revolute joint is symmetrically disposed in a diametric direction of the outer circumferential surface of the lower platform inner ring; in the meantime, a pair of the second part 2-42 of the third revolute joint is disposed in the inner circumferential surface of the lower platform middle ring of the lower moving platform gyroscopic subcomponent 2-2, which is also arranged in a face-to-face position with the first part 2-41 of the third revolute joint. After the first and second parts of the third revolute joint are assembled, the rotation around the X' axis can be achieved. Then, the first part 2-43 of the fourth revolute joint is symmetrically disposed in the diametrical direction of the outer circumferential surface of the lower platform middle ring of the lower moving platform gyroscopic subcomponent 2-2, which is also perpendicular to the X' axis; in the meantime, the second part 2-44 of the fourth revolute joint is disposed in the inner circumferential surface of the lower platform outer ring, in a face-to-face position with the first part 2-43 of the fourth revolute joint. After the first and second parts of the fourth revolute joint are assembled, the relative rotation between the two parts can be achieved, thereby the lower platform middle ring can rotate around the Y' axis freely, which is perpendicular to the X' axis.

Further, a screw-nut subcomponent 2-3 is disposed between the upper moving platform and the lower moving platform; and the screw-nut subcomponent 2-3 includes a ball-screw-nut assembly and a flanged handle sleeve.

Further, the specific configuration of the screw-nut subcomponent 2-3 is as below: the nut 2-3-1 is secured to the inner ring of the upper moving platform of the double-gyroscopic component, and the lower end of the screw 2-3-2 is connected to the inner ring of the lower moving platform of the double-gyroscopic component by a revolute joint.

Further, the specific configuration of the screw-nut subcomponent 2-3 is as below: the upper end of the screw 2-3-2 is secured to the inner ring of the upper moving platform of the double-gyroscopic component, and the nut 2-3-1 is secured to the inner ring of the lower moving platform gyroscopic subcomponent by the flanged handle sleeve via a revolute joint.

Further, both modules of the 3-dof translational robotic component each comprise three driving motors 4 and three sets of identical limb.

Further, each limb comprises a mechanical upper arm 6 with a spherical joint, and two carbon fiber lower arms 7 with a spherical joint, which are mounted in pairs. One end of the mechanical upper arm 6 is connected to the output of the corresponding driving motor 4 by a flange, in order to be driven; and the other end of the mechanical upper arm 6 has a spherical joint, thereby achieving a pivotable connection with the two carbon fiber lower arms 7. Both ends of the carbon fiber lower arm 7 have a spherical joint, and are pivotally connected to the other end of the mechanical upper arm 6 and the lower platform outer ring of the lower moving platform gyroscopic subcomponent 2-2 respectively via a spherical joint. The mechanical upper arm 6 extends generally in a radial direction of the fixed platform, and the inner end of the mechanical upper arm 6 is connected to the output of the driving motor 4 in order to move relative to the fixed platform, the outer end of the mechanical upper arm 6 is pivotably connected to the upper end of the corresponding carbon fiber lower arm 7.

Further, at least one torsional elastic component 8 is disposed between the two carbon fiber lower arms 7. The torsional elastic component 8 is disposed at both ends of the two carbon fiber lower arms 7, and is arranged to be parallel to the end plane of the mechanical upper arm 6, which is also connected to the carbon fiber arm 7; and the torsional elastic component 8 is set in an extended state, with both ends pivotally connected to the two carbon fiber lower arms 7.

The 6-dof parallel robot with a double-gyroscopic component of the present provides the following advantages: excellent dynamic performance, compact structure, six degrees of freedom motion with no singularity, high rigidity, high precision, good stability, a large rotational workspace.

DETAILED DESCRIPTION OF THE PREFERRED EMBODIMENTS

The present invention will be further described in conjunction with the attached drawings and specific embodiments. Examples of the embodiments are shown in the drawings, in which the identical or similar reference numbers are used to denote identical or similar elements or elements with identical or similar functions. The following embodiments described with reference to the drawings are illustrative, which is intended to explain the present invention, and should not be interpreted as the restrictions of this invention.

The 6-dof parallel robot with a double-gyroscopic component of the present invention will be described with reference to FIGS. 1-6, which comprises: a fixed platform 1, a moving platform 2 and two modules of 3-dof translational robotic component 3.

The fixed platform 1 is a rigid plate, and the overall shape thereof could be circular or polygonal. Preferably, the rigid plate is provided with a central installation through hole in the central position thereof for subsequent assembly. A number of slots are disposed at the near-edge positions, which can be 6. The slots are used for avoiding collisions between robot arms and the fixed platform. Further, the fixed platform 1 is provided with a plurality of bolt mounting holes for installing other members. Preferably, at least some of the bolt mounting holes are disposed in the vicinity of the slots, for installing a driving motor 4 or its mounting base.

The moving platform 2 is constituted by the double-gyroscopic component, which comprises an upper moving platform gyroscope subcomponent 2-1, a lower moving platform gyroscope subcomponent 2-2 and screw-nut subcomponent 2-3. The upper moving platform gyroscope subcomponent 2-1 is located below the fixed platform 1 and above the lower moving platform gyroscope subcomponent 2-2. The lower moving platform gyroscope subcomponent 2-2 is located below the upper moving platform gyroscope subcomponent 2-1.

Figure 3:
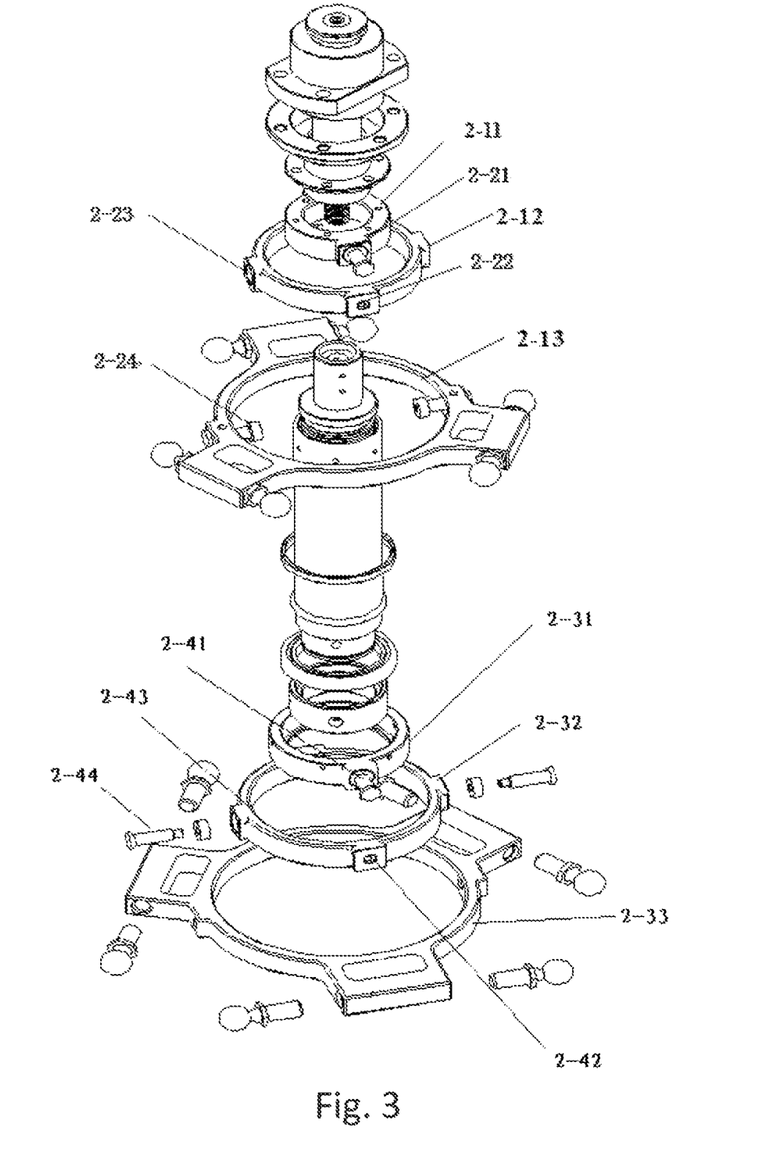
FIG. 3 is an exploded view of the gyroscope components in the 6-dof parallel robot with a double-gyroscopic component of the present invention.

Specifically, the upper moving platform gyroscope subcomponent 2-1 comprises an upper platform inner ring 2-11, an upper platform middle ring 2-12, and an upper platform outer ring 2-13. The upper platform outer ring 2-13 surrounds the upper platform inner ring 2-11 and the upper platform middle ring 2-12. The upper platform middle ring 2-12 surrounds the upper platform inner ring 2-11. A pair of the first part 2-21 of the first revolute joint is symmetrically disposed in a diametric direction of the outer circumferential surface of the upper platform inner ring; in the meantime, a pair of the second part of the first revolute joint is disposed in the inner circumferential surface of the upper platform middle ring of the upper moving platform gyroscopic subcomponent 2-1, which is also arranged in a face-to-face position with the first part 2-21 of the first revolute joint; after the first and second parts of the first revolute joint are assembled, the relative rotation between the two parts can be achieved, which guarantees the upper platform inner ring rotating around the axis in the diametric direction. This axis is defined as the X axis in the present invention.

The first part 2-23 of the second revolute joint is symmetrically disposed in the diametrical direction of the outer circumferential surface of the upper platform middle ring of the upper moving platform gyroscopic subcomponent 2-1, which is also perpendicular to the X axis; in the meantime, the second part 2-24 of the second revolute joint is disposed in the inner circumferential surface of the upper platform outer ring, in a face-to-face position with the first part 2-23 of the second revolute joint; after the first and second parts of the second revolute joint are assembled, the relative rotation between the two parts can be achieved, which guarantees the upper platform middle ring rotating around the axis in the direction perpendicular to the X axis. This axis is defined as the Y axis in the present invention.

The lower moving platform gyroscope subcomponent 2-2 comprises a lower platform inner ring 2-31, a lower platform middle ring 2-32, and a lower platform outer ring 2-33. The lower platform outer ring 2-33 surrounds the lower platform inner ring 2-32 and the lower platform middle ring 2-31, and the lower platform middle ring 2-32 surrounds the lower platform inner ring 2-31. A pair of the first part 2-41 of the third revolute joint is symmetrically disposed in a diametric direction of the outer circumferential surface of the lower platform inner ring 2-31; in the meantime, a pair of the second part 2-42 of the third revolute joint is disposed in the inner circumferential surface of the lower platform middle ring of the lower moving platform gyroscopic subcomponent 2-2, which is also arranged in a face-to-face position with the first part 2-41 of the third revolute joint; after the first and second parts of the third revolute joint are assembled, the relative rotation between the two parts can be achieved, which guarantees the lower platform inner ring rotating around the axis in this diametric direction. This axis is defined as the X' axis in the present invention.

Then, the first part 2-43 of the fourth revolute joint is symmetrically disposed in the diametrical direction of the outer circumferential surface of the lower platform middle ring of the lower moving platform gyroscopic subcomponent 2-2, which is also perpendicular to the X' axis; in the meantime, the second part 2-44 of the fourth revolute joint is disposed in the inner circumferential surface of the lower platform outer ring, in a face-to-face position with the first part 2-43 of the fourth revolute joint; after the first and second parts of the fourth revolute joint are assembled, the relative rotation between the two parts can be achieved, which guarantees the lower platform middle ring rotating around the axis in the direction perpendicular to the X' axis. This axis is defined as the Y' axis in the present invention.

Specifically, in the double-gyroscopic component, the X and Y axes of the upper moving platform are perpendicular to each other, and the X' and Y' axes of the lower moving platform are perpendicular to each other. In addition, the X axis is arranged to be parallel to the X' axis parallel, and the Y axis is arranged to be parallel to the Y' axis. By the differential motion of the upper and lower moving platforms, the double-gyroscopic component can achieve three rotational degrees of freedom of robot end-effector around the X, Y and Z axes, in which the differential motion of the upper and lower moving platforms in the vertical direction, i.e. the Z axis, is converted into the rotation of the robot end-effector around the Z axis through the ball screw-nut motion converting mechanism in the double-gyroscopic component.

The screw-nut subcomponent 2-3 is arranged between the upper and lower moving platforms of the double-gyroscopic component, so that the relative vertical motion of the upper and lower mobile platforms in the vertical direction, i.e. the Z axis direction, can be achieved. This screw-nut subcomponent 2-3 includes a ball screw, a nut, and a flanged handle sleeve.

Figure 1:
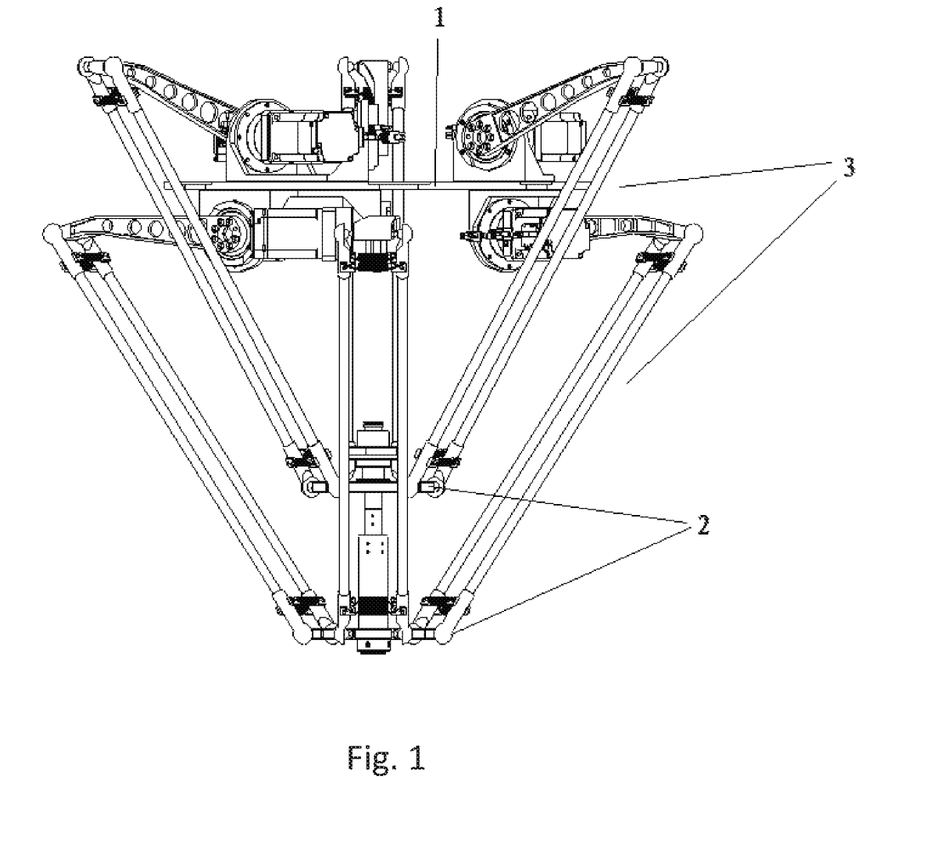
FIG. 1 is a structural view of the 6-dof parallel robot with a double-gyroscopic component of the present invention.
Figure 2:
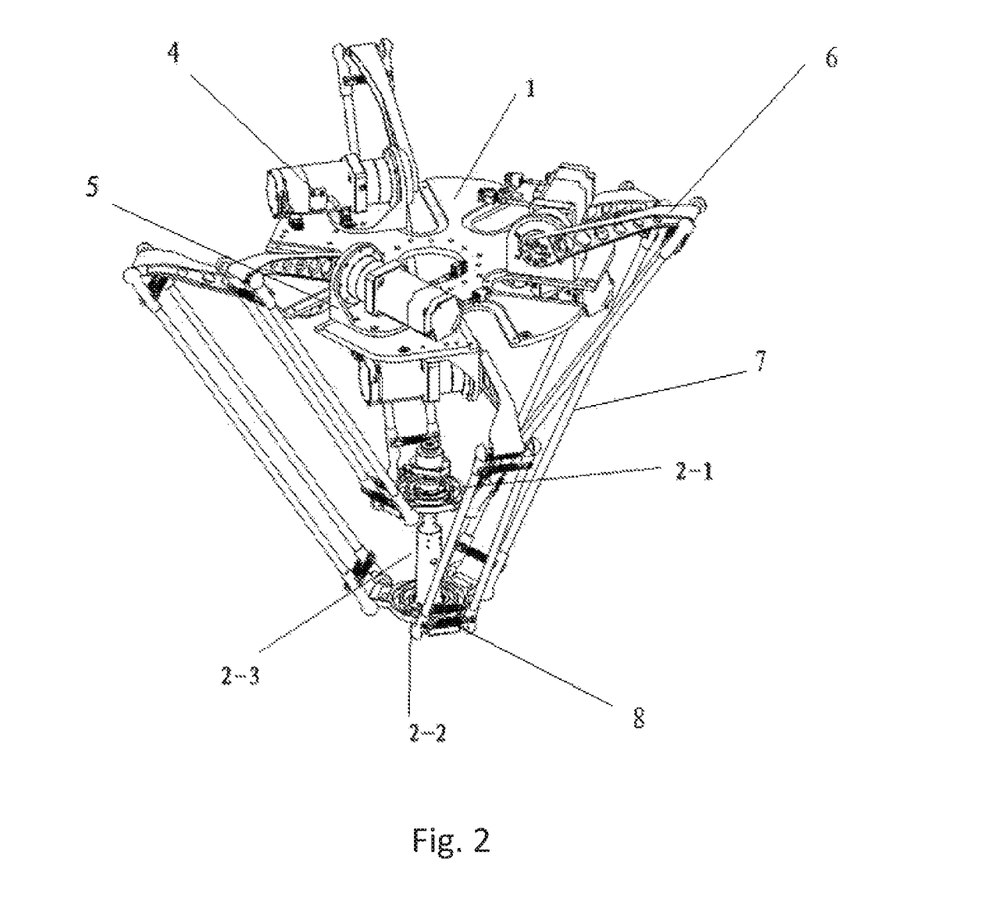
FIG. 2 is an isometric view of the 6-dof parallel robot with a double-gyroscopic component of the present invention.
Figure 4:
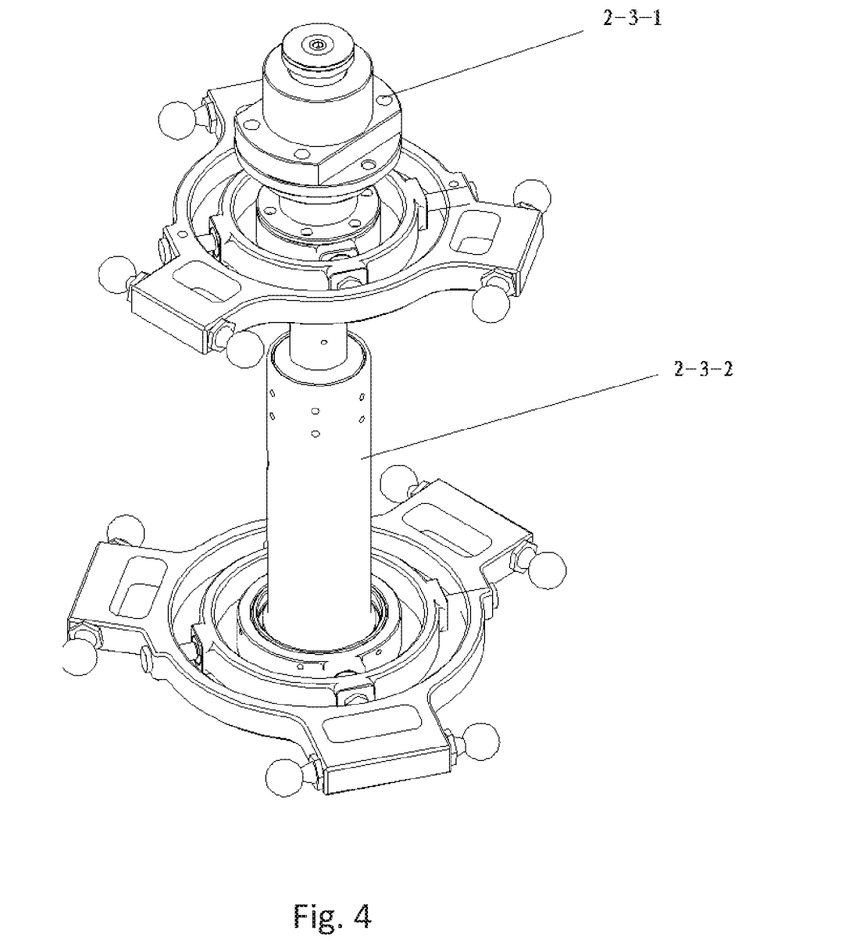
FIG. 4 is a view of the double-gyroscopic component in the 6-dof parallel robot of the present invention.

Specifically, as shown in FIGS. 2-4, the ball-screw-nut assembly, and the flanged handle sleeve assembly can be arranged as follows: the nut 2-3-1 is disposed over the upper moving platform of the double-gyroscopic component, and also fixed to the inner ring of the upper moving platform; the lower end of the screw 2-3-2 is fixed to the inner ring of the lower moving platform through the first part of the third revolute joint.

Figure 5:
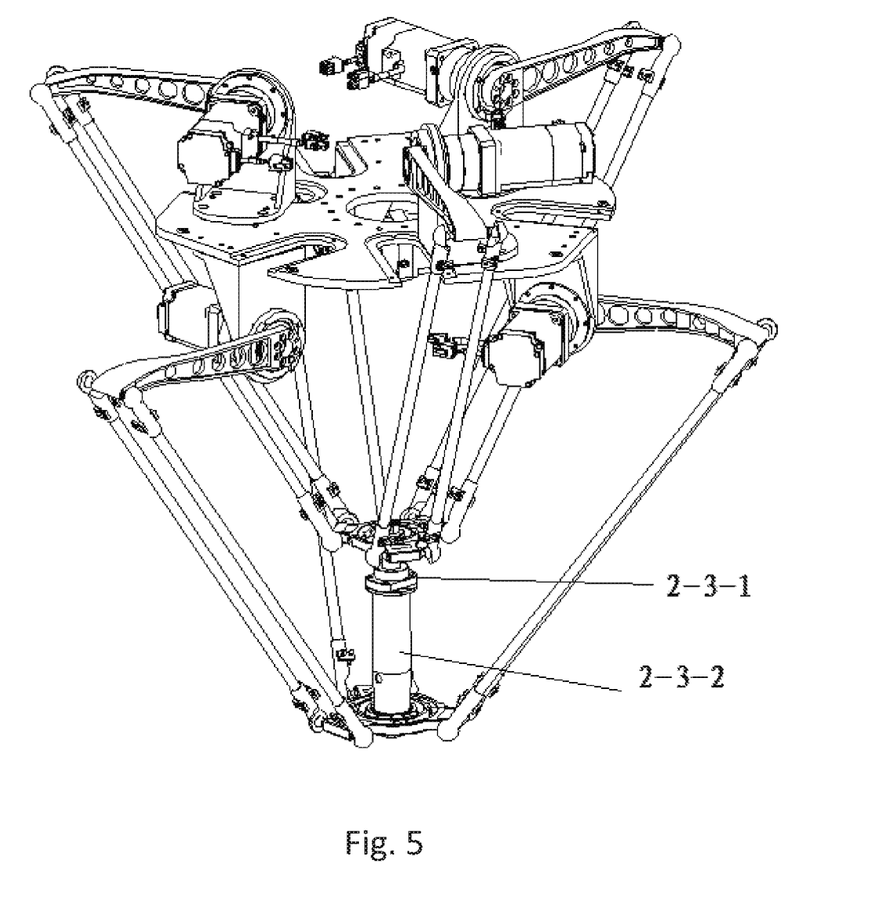
FIG. 5 is an isometric view of an alternative embodiment of the 6-dof parallel robot with a double-gyroscopic component of the present invention.
Figure 6:
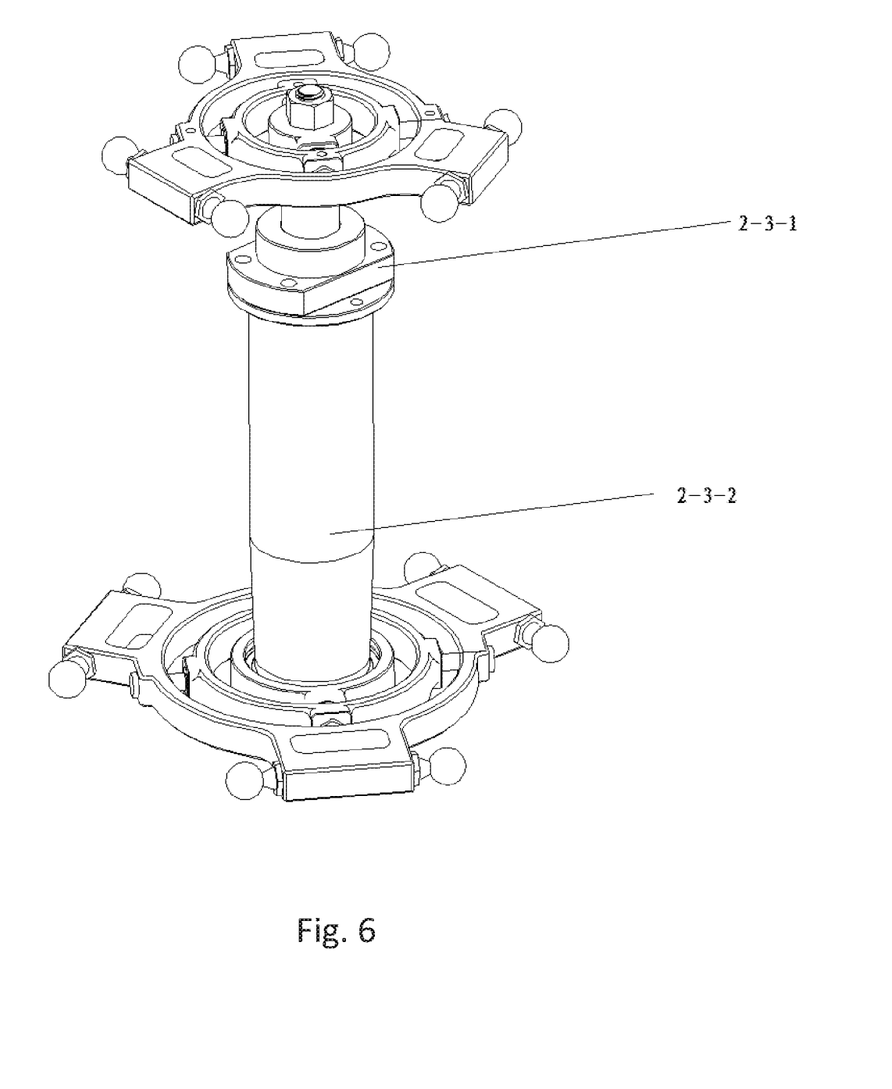
FIG. 6 is a view of an alternative embodiment of the double-gyroscopic component in the 6-dof parallel robot of the present invention.

Alternatively, as shown in FIGS. 5-6, the ball-screw-nut assembly, and the flanged handle sleeve assembly can be also arranged as follows: the nut 2-3-1 can be disposed between the upper and lower moving platforms of the double-gyroscopic component; the upper end of the screw 2-3-2 is fixed to the inner ring of the upper moving platform of the a double-gyroscopic component, the screw nut is fixed to the flanged handle sleeve, and the flanged handle sleeve is fixed to the lower platform inner ring by the first part of the third revolute joint.

In the above-mentioned two forms of installation structures of the screw-nut subassembly 2-3 in the 6-dof parallel robot with a double-gyroscopic component, the screw-nut subcomponent is connected to the upper and lower moving platforms; and also, in both cases, the differential motion around the Z axis between the upper and lower moving platforms, can be converted into the rotation of the robot end-effector around the Z axis through the ball-screw-nut motion converting mechanism.

Both modules of the 3-dof translational robotic component each comprise three driving motors 4 and three sets of limbs, which makes it totally six driving motors 4 and six sets of limbs in the system. Each limb comprises a mechanical upper arm 6 with a spherical joint, and two carbon fiber lower arms 7 with a spherical joint, which are mounted in pairs. One end of the mechanical upper arm 6 is connected to the output of the corresponding driving motor 4 by a flange, in order to be driven, and the other end of the mechanical upper arm 6 has a spherical joint, thereby achieving a pivotable connection with the two carbon fiber lower arms 7. Both ends of the carbon fiber lower arm 7 have a spherical joint, and are pivotally connected to the other end of the mechanical upper arm 6 and the lower platform outer ring of the lower moving platform gyroscopic subcomponent 2-2 respectively via a spherical joint; the mechanical upper arm 6 extends generally in a radial direction of the fixed platform. The inner end of the mechanical upper arm 6 is connected to the output of the driving motor 4 so as to move relative to the fixed platform; and the outer end of the mechanical upper arm 6 is pivotably connected to the upper end of the corresponding carbon fiber lower arm 7.

The mechanical upper arm 6 is defined as a first rod, and the two carbon fiber lower arms 7 are defined as second rods. The first rod is connected to the driving motor 4, and the two second rods are parallel arranged, the lower end of which is connected to the gyroscope component of the moving platform. The two second rods are respectively connected to the first rod to form a sub-component each, and the second rod is longer than the first rod. Each end of the first rod is connected with the two second rods respectively via a spherical joint.

At least one torsional elastic component 8 is disposed between the two second rods. The torsional elastic component 8 is disposed at both ends of the two second rods, and is arranged to be parallel to the end plane of the first rod which is also connected to the second rod. The torsional elastic component 8 is preferably arranged to be adjacent to one end of the first rod. The torsional elastic component 8 is pre-installed in an extended state, and both ends are pivotally connected to the two second rods.

Specifically, the torsional elastic component 8 could be two springs. Each end of the spring is designed to have a hook. Another hang hook should be pre-designed in the corresponding position of the second rod where the torsional elastic component is installed. The hook is connected to the hang hook to be fixed together. The two springs are respectively mounted to in the direction of facing and opposing the central axis of the apparatus.

Six sets of limbs are divided into two groups, each of which includes three limbs. The first group is connected between the fixed platform and the upper moving platform, and the second group is connected between the fixed platform and the lower moving platform. The six driving motors 4 are installed on the fixed platform by the driving motor brackets 5. Preferably, the three driving motors corresponding to the first group of limbs 4 are respectively mounted on the top surface of the fixed platform by the driving motor brackets 5, and the three driving motors corresponding to the second group of limbs are respectively installed on the bottom surface of the fixed platform by the driving motor brackets 5. The six driving motor brackets 5 are installed respectively on the top and bottom surfaces along the outer circumference of the fixed platform with an equally divided angle of 120 degrees. Each driving motor brackets 5 extends in a direction of facing away from the platform. The driving motors 4 and the limbs are respectively installed on both ends of the driving motor brackets 5 in the circumferential direction of the platform. The output shaft of the driving motor 4 passes through the installation plate and is connected to the driving arm (mechanical upper arm).

Specifically, the three degrees of freedom of translational robot of the present invention includes but not limited to: any spatial translational serial mechanism such as a mechanism constituted by three prismatic joints connected in series; or any spatial translational parallel mechanism such as Delta mechanism, Gantry Robot mechanism, Cartesian Robot means, Orthoglide mechanism, or Tsai's mechanism.

The 6-dof parallel robot with the double-gyroscopic component, according to the present invention, could control the moving platform of the two groups of the three degrees of freedom translational robot, to translate in X, Y and Z directions by controlling six independent driving motors independently. By the differential motion of the upper and lower moving platforms, the end-effector of the double-gyroscopic component can achieve three rotational degrees of freedom around the X, Y and Z axes, in which the differential motion of the upper and lower moving platforms in the Z axis direction is converted into the rotation of the robot end-effector around the Z axis through the ball-screw-nut mechanism. By synchronous movement of the upper and lower moving platforms, the three translational degrees of freedom of robot end-effector around the X, Y and Z axes can be achieved, thus achieving a flexible operation with six degrees of freedoms in the operational space, e.g., carrying out coating, polishing, grinding of complex surface. The present invention has the following advantages: excellent dynamic performance, compact structure, six degrees of freedom motion with no singularity, high rigidity, high precision, good stability, a large space of rotation for working etc., thus having a broad prospect in both scientific research and industrial application.

In the above description, the X and Y axes could be understood to be in the horizontal plane and perpendicular to each other, and the Z axis could be understood as a normal direction of the plane in which the X and Y are located.

Other components or operations of the 6-dof parallel robot with the double-gyroscopic component are known to the person skilled in the art, which will not be elaborated here.

In the description of the present invention, It should be understood that the terms "center", "longitudinal", "lateral", "length", "width", "thickness", "upper", "lower", "front", "rear", "left", "right", "vertical", "horizontal", "top", "bottom", "inner", "outer", "clockwise", "counterclockwise", "axial", "radial", "circumferential" along with any other terms refer to the directional relationship or the positional relationship shown in the drawings, which are for convenience of description and better understanding of the present invention, and not for indicating or implying that the device or component must have a specific orientation, or a particular configuration, thereby should not being interpreted as the limitation of the present invention.

In addition, the terms "first", "second" are used for purposes of description, and not used to indicate or imply relative importance or the number of technical features. Thus, the features limited by "first", "second" could indicate or imply that one or more of the features are included. In the description of the present invention, the meaning of "more" is two or more, unless expressly indicated otherwise.

In the present invention, unless expressly indicated otherwise, the terms "install", "connect", "secure", "fix" and the like should be interpreted broadly. For example, it can be fixed connection, detachable connection, or integrated into one part. In addition, it can be a mechanically connected, electrically connected, or communicatively connected; in other cases, it can be direct connection or indirect connection via some medium, communication or interaction between two elements. For persons skilled in the art, the meanings of these terms in the present invention can be understood on the basis of specific situation.

In the description of the present invention, the wording "an embodiment", "embodiments", "example", "specific examples" or "some examples" is intended to mean that a particular feature, structure, material or characteristic described in connection with the example or embodiment is included in at least one example or embodiment of the present invention. Also, the schematic representation of these terms is not necessarily for the same example or embodiment. Furthermore, the described features, structures, materials or characteristics can be combined in any suitable manner in one or more examples or embodiments. In addition, if there exists no contradiction, persons skilled in the art could combine the features, systems or methods from different example or embodiment.

While this invention has been particularly shown and described with reference to exemplary embodiments, it can be understood by those skilled in the art that various changes in form and/or details could be made without departing from the spirit and scope of the invention as defined by the appended claims and their legal equivalents.

The invention claimed is:

1. A 6-dof parallel robot with a double-gyroscopic component, characterized in that
the 6-dof parallel robot comprises a fixed platform (1), a moving platform (2) and two modules of 3-dof translational robotic component (3), wherein the two modules of 3-dof translational robotic component (3) are connected between the moving platform (2) and the fixed platform (1);
the moving platform (2) is constituted by the double-gyroscopic component, which comprises an upper moving platform gyroscope subcomponent (2-1), a lower moving platform gyroscope subcomponent (2-2) and a screw-nut subcomponent (2-3);
the upper moving platform gyroscope subcomponent (2-1) comprises an upper platform inner ring, an upper platform middle ring, and an upper platform outer ring;
wherein a pair of a first part (2-21) of a first revolute joint is symmetrically disposed in a diametric direction of an outer circumferential surface of the upper platform inner ring;
wherein a pair of a second part of the first revolute joint is disposed in an inner circumferential surface of the upper platform middle ring of the upper moving platform gyroscopic subcomponent (2-1), which is also arranged in a face-to-face position with the first part (2-21) of the first revolute joint;
wherein a rotation around an X axis is achieved after the first and second parts of the first revolute joint are assembled,
wherein a first part (2-23) of a second revolute joint is symmetrically disposed in a diametrical direction of an outer circumferential surface of the upper platform middle ring of the upper moving platform gyroscopic subcomponent (2-1), which is perpendicular to the X axis;
wherein a second part (2-24) of the second revolute joint is disposed in an inner circumferential surface of the upper platform outer ring, in a face-to-face position with the first part (2-23) of the second revolute joint;
wherein a relative rotation between the first and second parts of the second revolute joint is achieved after the first and second parts of the second revolute joint are assembled, thereby the upper platform middle ring rotates around the Y axis freely, which is perpendicular to the X axis.

2. The 6-dof parallel robot with the double-gyroscopic component according to claim 1, characterized in that
the lower moving platform gyroscope subcomponent (2-2) comprises a lower platform inner ring, a lower platform middle ring, and a lower platform outer ring, wherein the lower platform outer ring surrounds the lower platform inner ring and the lower platform middle ring, and the lower platform middle ring surrounds the lower platform inner ring,
wherein a pair of a first part (2-41) of a third revolute joint is symmetrically disposed in a diametric direction of an outer circumferential surface of the lower platform inner ring;
wherein a pair of a second part (2-42) of the third revolute joint is disposed in an inner circumferential surface of the lower platform middle ring of the lower moving platform gyroscopic subcomponent (2-2), which is arranged in a face-to-face position with the first part (2-41) of the third revolute joint;
wherein a rotation around an X' axis is achieved, after the first and second parts of the third revolute joint are assembled,
wherein a first part (2-43) of a fourth revolute joint is symmetrically disposed in a diametrical direction of an outer circumferential surface of the lower platform middle ring of the lower moving platform gyroscopic subcomponent (2-2), which is perpendicular to the X' axis;
wherein a second part (2-44) of the fourth revolute joint is disposed in an inner circumferential surface of the lower platform outer ring, in a face-to-face position with the first part (2-43) of the fourth revolute joint;
wherein a relative rotation between the first and second parts of the fourth revolute joint is achieved after the first and second parts of the fourth revolute joint are assembled, thereby the lower platform middle ring rotates around a Y' axis freely, which is perpendicular to the X' axis.

3. The 6-dof parallel robot with the double-gyroscopic component according to claim 2, characterized in that
the screw-nut subcomponent (2-3) is disposed between the upper moving platform and the lower moving platform; and the screw-nut subcomponent (2-3) includes a ball-screw-nut assembly and a flanged handle sleeve.

4. The 6-dof parallel robot with the double-gyroscopic component according to claim 3, characterized in that
a specific configuration of the screw-nut subcomponent (2-3) is as below: a nut (2-3-1) is secured to the upper platform inner ring of the upper moving platform of the double-gyroscopic component, and a lower end of the screw (2-3-2) is connected to the lower platform inner ring of the lower moving platform of the double-gyroscopic component.

5. The 6-dof parallel robot with the double-gyroscopic component according to claim 3, characterized in that
the specific configuration of the screw-nut subcomponent (2-3) is as below: an upper end of the screw (2-3-2) is secured to the inner ring of the upper moving platform of the double-gyroscopic component, a nut (2-3-1) is secured to the inner ring of the lower moving platform gyroscopic subcomponent by the flanged handle sleeve via a revolute joint.

6. The 6-dof parallel robot with the double-gyroscopic component according to claim 1, characterized in that
both modules of the 3-dof translational robotic component each comprise three driving motors (4) and three sets of identical limbs.

7. The 6-dof parallel robot with the double-gyroscopic component according to claim 6, characterized in that
each limb comprises a mechanical upper arm (6) with a spherical joint, and two carbon fiber lower arms (7) with a spherical joint, which are mounted in pairs,
wherein one end of the mechanical upper arm (6) is connected to the corresponding driving motor (4) by a flange, so as to be driven, and another end of the mechanical upper arm (6) has a spherical joint, thereby achieving a pivotable connection with the two carbon fiber lower arms (7), wherein both ends of the carbon fiber lower arm (7) have a spherical joint, and are pivotally connected to the other end of the mechanical upper arm (6), wherein three of the carbon fiber lower arms (7) are attached to the lower moving platform while another three of the carbon fiber lower arms (7) are attached to the upper moving platform, wherein the mechanical upper arm (6) extends generally in a radial direction of the fixed platform, wherein an inner end of the mechanical upper arm (6) is connected to the driving motor (4) so as to move relative to the fixed platform, and wherein an outer end of the mechanical upper arm (6) is pivotably connected to an upper end of the corresponding carbon fiber lower arm (7).

8. The 6-dof parallel robot with the double-gyroscopic component according to claim 7, characterized in that at least one torsional elastic component (8) is disposed between the two carbon fiber lower arms (7), wherein the torsional elastic component (8) is disposed at both ends of the two carbon fiber lower arms (7), and is arranged to be parallel to an end plane of the mechanical upper arm (6), which is connected to the carbon fiber arm (7); and the torsional elastic component (8) is set in an extended state, with both ends pivotally connected to the two carbon fiber lower arms (7).

9. A 6-dof parallel robot with a double-gyroscopic component, characterized in that the 6-dof parallel robot comprises a fixed platform (1), a moving platform (2) and two modules of 3-dof translational robotic component (3), wherein the two modules of 3-dof translational robotic component (3) are connected between the moving platform (2) and the fixed platform (1);

the moving platform (2) is constituted by the double-gyroscopic component, which comprises an upper moving platform gyroscope subcomponent (2-1), a lower moving platform gyroscope subcomponent (2-2) and a screw-nut subcomponent (2-3);

the lower moving platform gyroscope subcomponent (2-2) comprises a lower platform inner ring, a lower platform middle ring, and a lower platform outer ring, wherein the lower platform outer ring surrounds the lower platform inner ring and the lower platform middle ring, and the lower platform middle ring surrounds the lower platform inner ring, wherein a pair of a first part (2-41) of a third revolute joint is symmetrically disposed in a diametric direction of an outer circumferential surface of the lower platform inner ring;

wherein a pair of a second part (2-42) of the third revolute joint is disposed in an inner circumferential surface of the lower platform middle ring of the lower moving platform gyroscopic subcomponent (2-2), which is arranged in a face-to-face position with the first part (2-41) of the third revolute joint;

wherein a rotation around an X' axis is achieved, after the first and second parts of the third revolute joint are assembled, wherein a first part (2-43) of a fourth revolute joint is symmetrically disposed in a diametrical direction of an outer circumferential surface of the lower platform middle ring of the lower moving platform gyroscopic subcomponent (2-2), which is perpendicular to the X' axis;

wherein a second part (2-44) of the fourth revolute joint is disposed in an inner circumferential surface of the lower platform outer ring, in a face-to-face position with the first part (2-43) of the fourth revolute joint;

wherein a relative rotation between the two first and second parts of the fourth revolute joint is achieved after the first and second parts of the fourth revolute joint are assembled, thereby the lower platform middle ring can rotate around a Y' axis freely, which is perpendicular to the X' axis.

\* \* \* \* \*